(12) United States Patent
Jiang et al.

(10) Patent No.: US 12,554,471 B2
(45) Date of Patent: Feb. 17, 2026

(54) METHOD, APPARATUS AND DEVICE FOR OPTIMIZING COMPILER BASED ON TENSOR DATA CALCULATION INFERENCE

(71) Applicant: OpenBayes (Tianjin) IT Co., Ltd., Tianjin (CN)

(72) Inventors: Han Jiang, Tianjin (CN); Chenhan Wang, Tianjin (CN); Xiangyu Pan, Tianjin (CN); Tianlei Lv, Tianjin (CN); Yanxin Wang, Tianjin (CN)

(73) Assignee: OpenBayes (Tianjin) IT Co., Ltd., Tianjin (CN)

(*) Notice: Subject to any disclaimer, the term of this patent is extended or adjusted under 35 U.S.C. 154(b) by 580 days.

(21) Appl. No.: 17/968,166

(22) Filed: Oct. 18, 2022

(65) Prior Publication Data
US 2024/0061661 A1    Feb. 22, 2024

(30) Foreign Application Priority Data
Aug. 19, 2022   (CN) .......................... 202211000908.3

(51) Int. Cl.
*G06F 8/41*  (2018.01)
*G06N 3/02*  (2006.01)

(52) U.S. Cl.
CPC ............... *G06F 8/41* (2013.01); *G06N 3/02* (2013.01)

(58) Field of Classification Search
CPC ...................................................... G06F 8/41
See application file for complete search history.

(56) References Cited

U.S. PATENT DOCUMENTS 11,237,880 B1    2/2022  Raumann et al.
2019/0392296 A1* 12/2019  Brady ................... G06N 3/063
(Continued)

FOREIGN PATENT DOCUMENTS

CN    112862107 A    5/2021
CN    113469336 A    10/2021
(Continued)

OTHER PUBLICATIONS

Boehm et al., Optimizing Tensor Computations: From Applications to Compilation and Runtime Techniques, SIGMOD/ PODS '23: Companion of the 2023 International Conference on Management of Data, pp. 53-59, dated May 8, 2023.
(Continued)

*Primary Examiner* — Duy Khuong T Nguyen
(74) *Attorney, Agent, or Firm* — Westbridge IP LLC (57) ABSTRACT

Disclosed are a method, an apparatus and a device for optimizing a compiler based on tensor data calculation inference. The method includes: obtaining design structure information of a compiler to be optimized, and obtaining a target intermediate conversion layer and an execution operation of the target intermediate conversion layer according to the design structure information; setting a target parameter tuning learning parameter according to the target intermediate conversion layer; determining a compiler object to be optimized according to the execution operation of the target intermediate conversion layer; and performing parameter tuning optimization on the compiler object to be optimized according to the target parameter tuning learning parameter through a target automatic parameter tuning strategy.

6 Claims, 4 Drawing Sheets

(56) References Cited

U.S. PATENT DOCUMENTS

| | | |
|---|---|---|
| 2020/0042362 A1 | 2/2020 | Cui et al. |
| 2021/0319157 A1 | 10/2021 | Yazdanbakhsh |
| 2022/0051104 A1* | 2/2022 | Interlandi ............... G06N 3/045 |
| 2022/0058008 A1 | 2/2022 | Zhang et al. |
| 2022/0066760 A1 | 3/2022 | Chang et al. |
| 2023/0176840 A1 | 6/2023 | Zhou et al. |
| 2023/0281907 A1* | 9/2023 | Lalonde ................ G06T 15/005 |
| | | 345/426 |

FOREIGN PATENT DOCUMENTS

| | | |
|---|---|---|
| CN | 113703768 A | 11/2021 |
| CN | 114138274 A | 3/2022 |
| CN | 114385182 A | 4/2022 |
| CN | 114492772 A | 5/2022 |
| CN | 116551217 A | 8/2023 |

OTHER PUBLICATIONS

Notification to Grant Patent Right for Invention issued in counterpart Chinese Patent Application No. 202211000908.3, dated Nov. 12, 2024.

Dong et al., Performance Optimizing Method for Sparse Convolutional Neural Networks on GPU, Journal of Sofware, vol. 31, No. 9, pp. 2944-2962, dated Sep. 15, 2020.

First Office Action issued in counterpart Chinese Patent Application No. 202211000908.3, dated Aug. 17, 2024.

Zhang et al., Multi-Modality Fusion Perception and Computing in Autonomous Driving, Journal of Computer Research and Development, vol. 57, No. 9, pp. 1781-1799, dated Sep. 1, 2020.

* cited by examiner

METHOD, APPARATUS AND DEVICE FOR OPTIMIZING COMPILER BASED ON TENSOR DATA CALCULATION INFERENCE

CROSS-REFERENCE TO RELATED APPLICATIONS

This application claims priority to Chinese Patent Application No. 202211000908.3, filed on Aug. 19, 2022, the entire contents of which are incorporated herein by reference.

TECHNICAL FIELD

The present disclosure relates to the technical field of deep learning, and in particular, to a method, an apparatus and a device for optimizing a compiler based on tensor data calculation inference.

BACKGROUND

As artificial intelligence continuously develops, deep learning technology has been widely used in various industries, and the application of deep learning is inseparable from inference frameworks, such as TensorFlow, PyTorch, and TNN frameworks. However, different inference frameworks have different functions. For example, TensorFlow and PyTorch are platform-level frameworks that can be used for training and inference, while TNN framework can only be used for inference. No matter what kind of functional framework, some related acceleration devices are adapted. In order to facilitate the reasoning of tensor data, the concept of a compiler is introduced, that is, a series of operations are performed on the model developed by the developer through the compiler. However, the compiler operates in different ways for different models. If the compiler is not optimized in time, the compiler will not fit the input model, resulting in low efficiency of tensor data inference.

The statements in this section merely provide background information related to the present disclosure and may not constitute prior art.

SUMMARY

The main objective of the present disclosure is to provide a method, an apparatus and a device for optimizing a compiler based on tensor data calculation inference, which aims to solve the technical problem that the compiler that fits the specified input model cannot be obtained in the related art, resulting in low efficiency of tensor data inference.

In order to achieve the above objective, the present disclosure provides a method for optimizing a compiler based on tensor data calculation inference, including:
obtaining design structure information of a compiler to be optimized, and obtaining a target intermediate conversion layer and an execution operation of the target intermediate conversion layer according to the design structure information;
setting a target parameter tuning learning parameter according to the target intermediate conversion layer;
determining a compiler object to be optimized according to the execution operation of the target intermediate conversion layer; and
performing parameter tuning optimization on the compiler object to be optimized according to the target parameter tuning learning parameter through a target automatic parameter tuning strategy.

In some embodiments, the obtaining the design structure information of the compiler to be optimized, and obtaining the target intermediate conversion layer and the execution operation of the target intermediate conversion layer according to the design structure information includes:
obtaining the design structure information of the compiler to be optimized, and obtaining a corresponding layered set according to the design structure information;
selecting the target intermediate conversion layer in the layered set according to layered characteristics;
obtaining a process of generating a target self-decoding by a target unified format intermediate representation element according to the target intermediate conversion layer; and
obtaining the execution operation of the target intermediate conversion layer according to the process of generating the target self-decoding by the target unified format intermediate representation element.

In some embodiments, the target parameter tuning learning parameter includes at least one of a parameter tuning learning type, a target learning object and target parameter tuning times;
the setting the target parameter tuning learning parameter according to the target intermediate conversion layer includes:
obtaining data exchange times and data decomposition performance of generating a target self-decoding;
setting the parameter tuning learning type and the target learning object according to the data exchange times and the data decomposition performance;
obtaining a target range of the parameter according to the intermediate conversion layer, and obtaining a parameter maximum value and a parameter minimum value according to the target range; and
setting the target parameter tuning times according to the parameter maximum value and the parameter minimum value.

In some embodiments, the determining the compiler object to be optimized according to the execution operation of the target intermediate conversion layer includes:
obtaining an execution node of a target intermediate layer according to the execution operation of the intermediate conversion layer;
obtaining a data optimization strategy of each layer set in the target intermediate layer;
determining a target operation to be performed by each layer according to the execution node and the data optimization strategy of each layer; and
obtaining the compiler object to be optimized according to the target operation to be performed by each layer.

In some embodiments, the obtaining the compiler object to be optimized according to the target operation to be performed by each layer includes:
obtaining a calculation graph of a specified input model according to the target operation to be performed by each layer;
obtaining memory loading data of each operation according to the calculation graph of the specified input model;
obtaining multi-layer operation interaction data according to the memory loading data; and
using a multi-layer operation of the multi-layer operation interaction data as the compiler object to be optimized.

In some embodiments, the obtaining the compiler object to be optimized according to the target operation to be performed by each layer includes:

obtaining a unified format intermediate representation element to be processed according to the target operation to be performed by each layer;

constructing a target feature matrix according to the unified format intermediate representation element to be processed;

obtaining matrix calculation duration and matrix calculation occupied resources according to the target feature matrix; and in response that the matrix calculation duration is greater than a preset duration threshold and/or the matrix calculation occupied resources are greater than a preset storage resource threshold, using the matrix calculation duration and the matrix calculation occupied resources as the compiler object to be optimized.

In some embodiments, after the performing the parameter tuning optimization on the compiler object to be optimized according to the target parameter tuning learning parameter through the target automatic parameter tuning strategy, the method further includes:

setting a corresponding initial optimization strategy according to the compiler object to be optimized;

adjusting the initial optimization strategy according to the target parameter tuning learning parameter;

obtaining a parameter optimization range according to the adjusted initial optimization strategy; and performing the parameter tuning optimization on the compiler object to be optimized within the parameter optimization range through the target automatic parameter tuning strategy, to obtain a compiler conforming to a specified input model.

Besides, in order to achieve the above objective, the present disclosure further provides an apparatus for optimizing a compiler based on tensor data calculation inference, including:

an acquisition module for obtaining design structure information of a compiler to be optimized, and obtaining a target intermediate conversion layer and an execution operation of the target intermediate conversion layer according to the design structure information;

a setting module for setting a target parameter tuning learning parameter according to the target intermediate conversion layer;

a determination module for determining a compiler object to be optimized according to the execution operation of the target intermediate conversion layer; and an optimization module for performing parameter tuning optimization on the compiler object to be optimized according to the target parameter tuning learning parameter through a target automatic parameter tuning strategy.

Besides, in order to achieve the above objective, the present disclosure further provides a device for optimizing a compiler based on tensor data calculation inference, including a memory, a processor, and a program for optimizing the compiler based on tensor data calculation inference stored in the memory and executable on the processor, the program for optimizing the compiler based on tensor data calculation inference is configured to implement the method for optimizing the compiler based on tensor data calculation inference as described above.

Besides, in order to achieve the above objective, the present disclosure further provides a non-transitory computer readable storage medium, a program for optimizing a compiler based on tensor data calculation inference is stored in the non-transitory computer readable storage medium, and when the program for optimizing the compiler based on tensor data calculation inference is executed by a processor, the method for optimizing the compiler based on tensor data calculation inference as described above is implemented.

The present disclosure provides a method for optimizing a compiler based on tensor data calculation inference, including: obtaining design structure information of a compiler to be optimized, and obtaining a target intermediate conversion layer and an execution operation of the target intermediate conversion layer according to the design structure information; setting a target parameter tuning learning parameter according to the target intermediate conversion layer; determining a compiler object to be optimized according to the execution operation of the target intermediate conversion layer; and performing parameter tuning optimization on the compiler object to be optimized according to the target parameter tuning learning parameter through a target automatic parameter tuning strategy. Through the above means, the target parameter tuning learning parameter is set according to the target intermediate conversion layer of the compiler to be optimized, and the compiler object to be optimized is determined according to the execution operation of the target intermediate conversion layer. The parameter tuning optimization is performed on the compiler object to be optimized from the perspective of target parameter tuning learning parameter through the target automatic parameter tuning strategy, so that a compiler that fits the specified input model can be obtained, thereby effectively improving the efficiency of tensor data inference.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, but not to limit the present disclosure.

Figure 1:
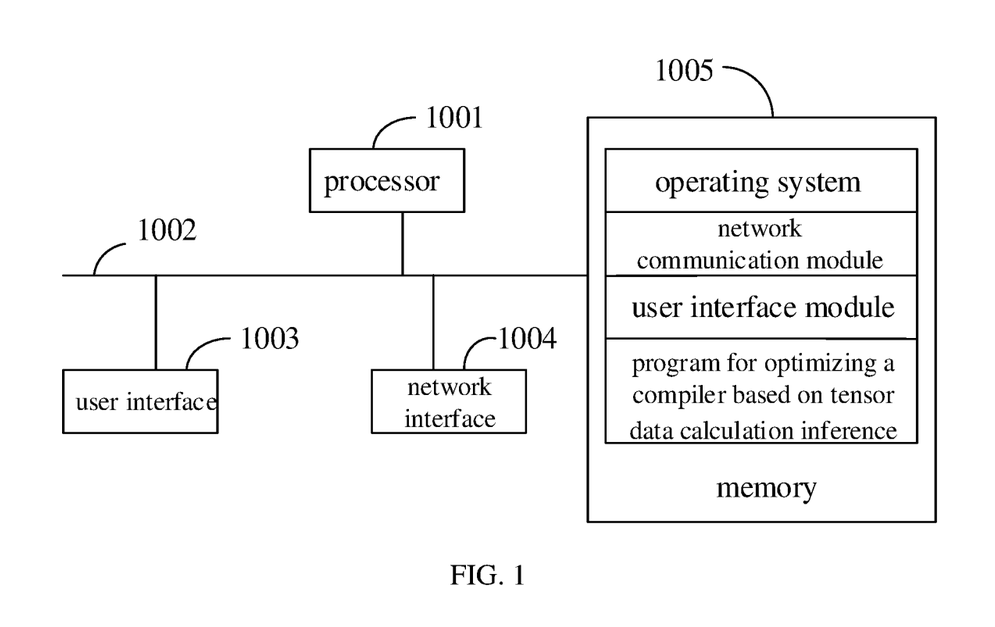
FIG. 1 is a schematic structural diagram of a device for optimizing a compiler based on tensor data calculation inference in a hardware operating environment according to an embodiment of the present disclosure.

As shown in FIG. 1, FIG. 1 is a schematic structural diagram of a device for optimizing a compiler based on tensor data calculation inference in a hardware operating environment according to an embodiment of the present disclosure.

As shown in FIG. 1, the device for optimizing the compiler based on tensor data calculation inference may include a processor 1001, such as a central processing unit (CPU), a communication bus 1002, a user interface 1003, a network interface 1004, and a memory 1005. The communication bus 1002 is configured to implement communication between the components. The user interface 1003 may include a display, an input unit such as a keyboard. The user interface 1003 may also include a standard wired interface and a wireless interface. The network interface 1004 may further include a standard wired interface and a wireless interface (such as a WI-FI interface). The memory 1005 may be a high-speed random access memory (RAM) or a non-volatile memory (NVM). The memory 1005 may also be a storage device independent of the foregoing processor 1001.

Those skilled in the art should understand that the structure shown in FIG. 1 does not limit the device for optimizing the compiler based on tensor data calculation inference, and the device may include more or fewer components than shown in FIG. 1, a combination of some components, or differently arranged components shown in FIG. 1.

As shown in FIG. 1, the memory 1005 as a storage medium may include an operating system, a network communication module, a user interface module, and a program for optimizing the compiler based on tensor data calculation inference.

In the device for optimizing the compiler based on tensor data calculation inference shown in FIG. 1, the network interface 1004 is mainly used for data communication with the network integration platform workstation, and the user interface 1003 is mainly used for data interaction with the user. The processor 1001 and the memory 1005 may be provided in the device for optimizing the compiler based on tensor data calculation inference. The device for optimizing the compiler based on tensor data calculation inference may call the program for optimizing the compiler based on tensor data calculation inference stored in the memory 1005 through the processor 1001, and perform the method for optimizing the compiler based on tensor data calculation inference provided by the embodiment of the present disclosure.

Based on the above hardware structure, the present disclosure provides a method for optimizing the compiler based on tensor data calculation inference.

Figure 2:
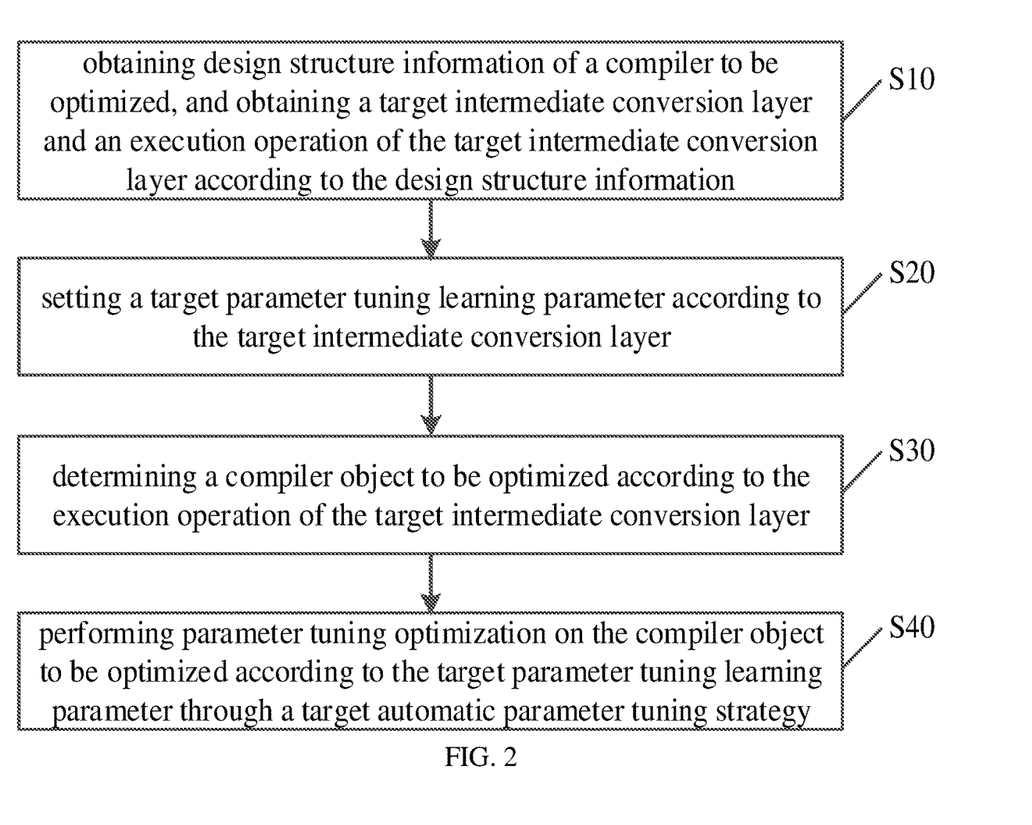
FIG. 2 is a schematic flowchart of a method for optimizing a compiler based on tensor data calculation inference according to an embodiment of the present disclosure.

As shown in FIG. 2, FIG. 2 is a schematic flowchart of a method for optimizing a compiler based on tensor data calculation inference according to an embodiment of the present disclosure.

In this embodiment, the method for optimizing the compiler based on tensor data calculation inference includes the following operations:

Operation S10, obtaining design structure information of a compiler to be optimized, and obtaining a target intermediate conversion layer and an execution operation of the target intermediate conversion layer according to the design structure information.

It should be noted that the executive subject in this embodiment is a device for optimizing a compiler based on tensor data calculation inference, and can also be other devices that can implement the same or similar functions, such as a controller for a tensor calculation compiler, which is not limited in this embodiment. In this embodiment, a controller for a tensor calculation compiler is used as an example for description.

It should be understood that the compiler to be optimized refers to the compiler for tensor data calculation inference that needs to be optimized. By optimizing the compiler, the optimized compiler is more suitable for the input model. Design structure information refers to the structure information of the compiler to be optimized. The design structure information includes the front-end access layer, the target intermediate conversion layer and the terminal execution layer, and is applied to the field of deep learning inference.

The execution operation of the target intermediate conversion layer refers to the execution operation of the target intermediate conversion layer to generate the target self-decoding.

Further, the operation S10 includes: obtaining the design structure information of the compiler to be optimized, and obtaining a corresponding layered set according to the design structure information; selecting the target intermediate conversion layer in the layered set according to layered characteristics; obtaining a process of generating a target self-decoding by a target unified format intermediate representation element according to the target intermediate conversion layer; and obtaining the execution operation of the target intermediate conversion layer according to the process of generating the target self-decoding by the target unified format intermediate representation element.

It can be understood that the layered set refers to the set composed of the various layers of the compiler to be optimized. For example, the front-end access layer is located at the first layer of the compiler to be optimized, the target intermediate conversion layer is located at the second layer of the compiler to be optimized, and the terminal execution layer is located at the third layer of the compiler to be optimized. Layered characteristics refer to the processing characteristics of each layer. For example, the characteristic of the front-end access layer is a unified format, the characteristic of the target intermediate conversion layer is to generate the target self-decoding, and the characteristic of the terminal execution layer is to generate the executable file of the target device.

It should be understood that after the target intermediate conversion layer is selected from the layered set, the process of generating the target self-decoding by the target unified format intermediate representation element is obtained. The front-end access layer transmits the target unified format intermediate representation element to the target intermediate conversion layer. The target intermediate conversion layer is optimized according to the set data optimization strategy. After the optimization is completed, a tensor calculation model file will be generated, and then the target self-decoding will be generated according to the tensor calculation model file. At this time, a series of processes that generate the target self-decoding are used as the execution operation of the target intermediate conversion layer.

Operation S20, setting a target parameter tuning learning parameter according to the target intermediate conversion layer.

It can be understood that the target parameter tuning learning parameter refers to the parameter for automatic parameter tuning of the compiler object to be optimized within the set range. The target parameter tuning learning parameter includes the parameter tuning learning type, the target learning object, and the target parameter tuning times. The parameter tuning learning type refers to the problem type of the parameter tuning learning. The target learning object refers to the goal of the parameter tuning learning. The target parameter tuning times refers to the number of times required to achieve the target. The target parameter tuning times is not infinite, but the maximum parameter tuning times within the target range set by the parameter.

Further, the target parameter tuning learning parameter includes a parameter tuning learning type, a target learning object and target parameter tuning times. The operation S20 includes: obtaining data exchange times and data decomposition performance of generating a target self-decoding; setting the parameter tuning learning type and the target learning object according to the data exchange times and the data decomposition performance; obtaining a target range of the parameter according to the intermediate conversion layer, and obtaining a parameter maximum value and a parameter minimum value according to the target range; and setting the target parameter tuning times according to the parameter maximum value and the parameter minimum value.

It should be understood that the data exchange times refers to the number of times the data of the target unified format intermediate representation element is exchanged between the video memory and the memory when the target intermediate conversion layer is optimized. The data decomposition performance refers to the performance of matrix decomposition when performing tensor calculation on the data of the target unified format intermediate representation element. Then, the parameter tuning learning type and the target learning object are set according to the data exchange times and the data decomposition performance, and the target parameter tuning times are set according to the parameter maximum value and the parameter minimum value.

Operation S30, determining a compiler object to be optimized according to the execution operation of the target intermediate conversion layer.

It should be understood that the compiler object to be optimized refers to the object to be optimized in the compiler to be optimized, that is, the optimization of the compiler to be optimized is realized by optimizing the object of the compiler to be optimized. The compiler object to be optimized is determined according to the execution operation of the target intermediate conversion layer, and the compiler object to be optimized includes but is not limited to multi-layer operation of multi-layer operation interactive data, matrix calculation duration, and matrix calculation occupied resources.

Operation S40, performing parameter tuning optimization on the compiler object to be optimized according to the target parameter tuning learning parameter through a target automatic parameter tuning strategy.

Further, the operation S40 includes: setting a corresponding initial optimization strategy according to the compiler object to be optimized; adjusting the initial optimization strategy according to the target parameter tuning learning parameter; obtaining a parameter optimization range according to the adjusted initial optimization strategy; and performing the parameter tuning optimization on the compiler object to be optimized within the parameter optimization range through the target automatic parameter tuning strategy, to obtain a compiler conforming to a specified input model.

It should be noted that the target automatic parameter tuning strategy refers to the strategy for tuning and optimizing the compiler object to be optimized. After obtaining the target parameter tuning learning parameters, the initial optimization strategy is adjusted through the target parameter tuning learning parameters, and then the parameter optimization range is obtained according to the adjusted initial optimization strategy. That is, a compiler suitable for the model of the input can be obtained by adjusting within the optimization parameter range. For example, the parameter optimization range is [0, 300]. After adjusting to 300 times, the compiler with the highest fit is used as the compiler that fits the specified input model during the tuning process.

In this embodiment, the method includes: obtaining design structure information of a compiler to be optimized, and obtaining a target intermediate conversion layer and an execution operation of the target intermediate conversion layer according to the design structure information; setting a target parameter tuning learning parameter according to the target intermediate conversion layer; determining a compiler object to be optimized according to the execution operation of the target intermediate conversion layer; and performing parameter tuning optimization on the compiler object to be optimized according to the target parameter tuning learning parameter through a target automatic parameter tuning strategy. Through the above means, the target parameter tuning learning parameter is set according to the target intermediate conversion layer of the compiler to be optimized, and the compiler object to be optimized is determined according to the execution operation of the target intermediate conversion layer. The parameter tuning optimization is performed on the compiler object to be optimized from the perspective of target parameter tuning learning parameter through the target automatic parameter tuning strategy, so that a compiler that fits the specified input model can be obtained, thereby effectively improving the efficiency of tensor data inference.

Figure 3:
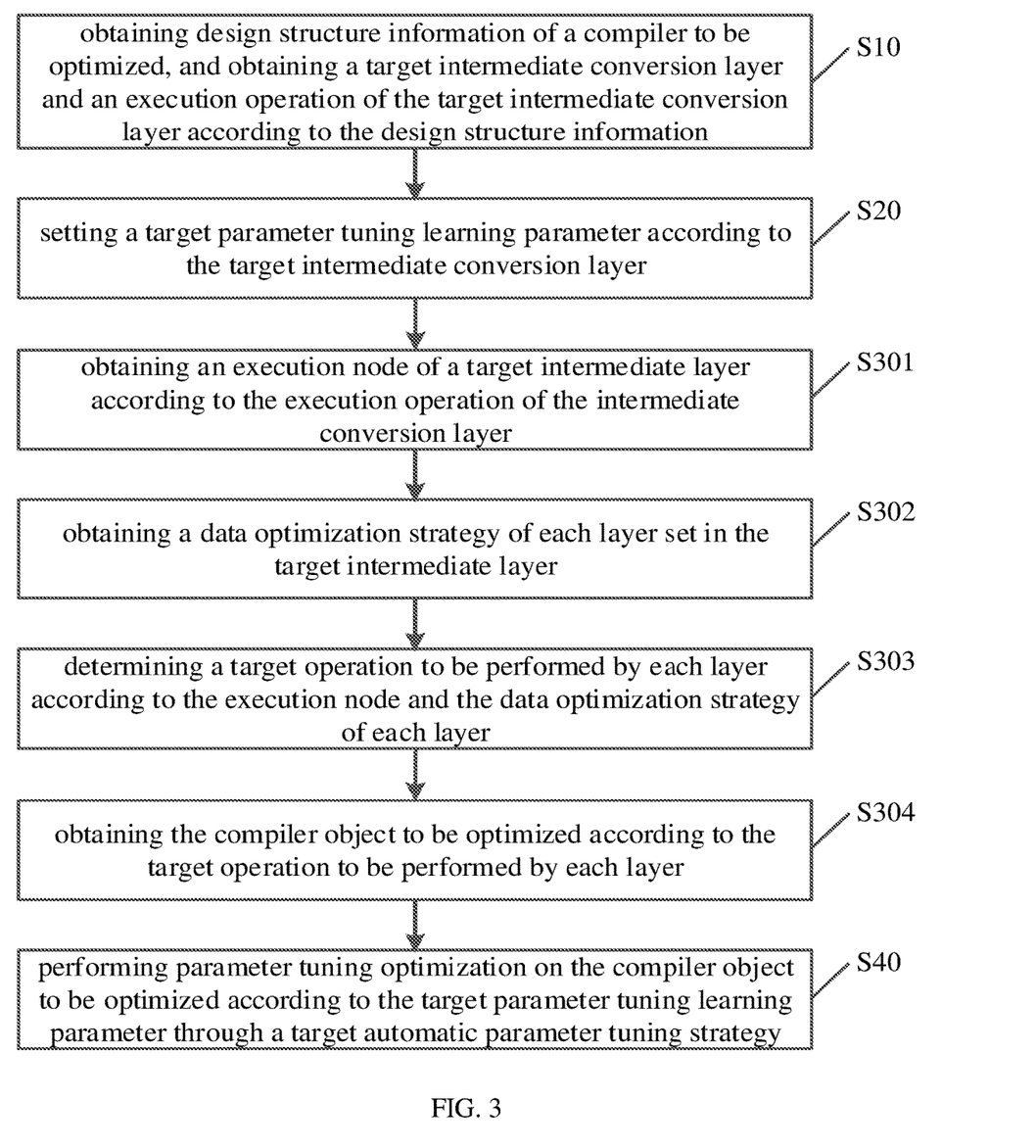
FIG. 3 is a schematic flowchart of a method for optimizing a compiler based on tensor data calculation inference according to another embodiment of the present disclosure.

In an embodiment, as shown in FIG. 3, the operation S30 includes:

Operation S301, obtaining an execution node of a target intermediate layer according to the execution operation of the intermediate conversion layer.

It should be noted that the execution node refers to the node where each layer of the target intermediate conversion layer executes the target unified format intermediate representation element, and there can be multiple execution nodes, that is, the same node can perform multiple operations.

Operation S302, obtaining a data optimization strategy of each layer set in the target intermediate layer.

It can be understood that the data optimization strategy refers to the strategy of optimizing the target unified format intermediate representation element for each layer of the target intermediate conversion layer. The data optimization strategy includes but is not limited to operator fusion optimization strategy, matrix factorization optimization strategy, and convolution operator optimization strategy.

Operation S303, determining a target operation to be performed by each layer according to the execution node and the data optimization strategy of each layer.

It should be understood that after the execution node is obtained, the target operation to be performed at each layer of the execution node is obtained according to the data optimization strategy. For example, there are three execution nodes in the target intermediate conversion layer, namely the first execution node, the second execution node and the third execution node. The operator fusion optimization strategy and the matrix factorization optimization strategy are set at the layer where the first execution node is located. The matrix factorization optimization strategy is set at the layer where the second execution node is located. The matrix decomposition optimization strategy and the convolution operator optimization strategy are set at the layer where the third execution node is located, and then the corresponding target operation is obtained when each execution node executes.

Operation S304, obtaining the compiler object to be optimized according to the target operation to be performed by each layer.

It can be understood that after obtaining the target operation to be performed by each layer, the compiler object to be optimized is determined according to the target operation to be performed by each layer. The compiler object to be optimized includes, but is not limited to, multi-layer operation of multi-layer operation interactive data, matrix calculation duration, and matrix calculation occupied resources.

Further, the operation S304 includes: obtaining a calculation graph of a specified input model according to the target operation to be performed by each layer; obtaining memory loading data of each operation according to the calculation graph of the specified input model; obtaining multi-layer operation interaction data according to the memory loading data; and using a multi-layer operation of the multi-layer operation interaction data as the compiler object to be optimized.

It should be understood that the calculation graph refers to the calculation structure diagram of the file corresponding to the specified input model. Since in the calculation graph of the model, each operation needs to load data from the memory, and then calculate the loaded data. After the calculation is completed, the calculation result is returned to the memory. The above operations will involve multiple layers, and multi-layer operations will inevitably bring a large amount of data interaction, that is, multi-layer operation interact data. Therefore, it is necessary to optimize the multi-layer operation of the multi-layer operation interactive data, that is, the multi-layer operation is used as the compiler object to be optimized. The specific optimization method is to use cony (convolution)+bias (bias)+relu (activation function), which are three operators that are often used continuously, the three operators are fused, and then the fusion operators are grouped. For example, 5*5 is one group, 3*3 and 4 1*1 fusion operators are another group. Through the above optimization methods, the bandwidth resources of the hardware can be maximized and the data transmission speed can be maximized. At this time, the optimized compiler is most suitable for the model of the specified input.

Further, the operation S304 further includes: obtaining a unified format intermediate representation element to be processed according to the target operation to be performed by each layer; constructing a target feature matrix according to the unified format intermediate representation element to be processed; obtaining matrix calculation duration and matrix calculation occupied resources according to the target feature matrix; and in response that the matrix calculation duration is greater than a preset duration threshold and/or the matrix calculation occupied resources are greater than a preset storage resource threshold, using the matrix calculation duration and the matrix calculation occupied resources as the compiler object to be optimized.

It can be understood that after obtaining the unified format intermediate representation element to be processed transmitted by the front-end access layer, the unified format intermediate representation element to be processed is constructed into a target feature matrix. Matrix multiplication is a necessary operation for tensor calculation. For example, matrix 32 and matrix 32 are multiplied, and the complexity of the multiplication calculation is cubic, and the higher the complexity, the more resources occupied by the matrix calculation and the longer the time. The matrix calculation duration and the matrix calculation occupied resources are taken as optimization objects. The 32*32 matrix is split into multiple small matrices with side lengths of 32, 16, 8, 4 and 2 different lengths. Then, the large matrix multiplication calculation is changed into a small matrix multiplication calculation, and the optimal decomposition method is determined by the target automatic parameter tuning strategy, For example, it is determined that the hardware is optimized for 4*4 matrix multiplication through the target automatic parameter tuning strategy, which will reduce the matrix calculation duration and reduce the matrix calculation occupied resources, and the 32*32 matrix is split into 64 small 4*4 matrices for calculation.

It should be understood that the compiler object to be optimized can also calculate convolution operations for tensors. For example, the convolution operation is as follows: the input and output tensor sizes are both 32*32, the number of input channels is 3, the number of output channels is 16, the convolution kernel is 3*3. Through the above parameters, a total of 32*32*3*3*3*16*32*32 multiplication and addition operations are required. Obviously, the calculation duration through the above convolution operation is relatively high. The above convolution operation is adjusted through the target automatic parameter tuning strategy to find the fastest tensor convolution calculation method. The input and output tensors are split into different sizes of 32, 16, 8, 4 and 2, and the number of channels is split into different sizes of 16, 8, 4 and 2.

In this embodiment, the method includes: obtaining the execution node of the target intermediate layer according to the execution operation of the intermediate conversion layer; obtaining the data optimization strategy of each layer set in the target intermediate layer; determining the target operation to be performed by each layer according to the execution node and the data optimization strategy of each layer; and obtaining the compiler object to be optimized according to the target operation to be performed by each layer. Through the above means, according to the execution operation of the intermediate conversion layer, the execution node of the target intermediate conversion layer is obtained. According to the execution node of the target intermediate conversion layer and the data optimization strategy of each layer, the target operation to be performed by each layer is obtained. The compiler object to be optimized is determined according to the target operation to be performed by each layer. Thus, the accuracy of determining the compiler object to be optimized can be effectively improved.

Besides, the embodiments of the present disclosure further provide a storage medium. A program for optimizing a compiler based on tensor data calculation inference is stored in the storage medium, and when the program for optimizing the compiler based on tensor data calculation inference is executed by a processor, the operations of the method for optimizing the compiler based on tensor data calculation inference as described above are implemented.

Since the storage medium adopts all the technical solutions of the above-mentioned embodiments, it has at least all the beneficial effects brought by the technical solutions of the above-mentioned embodiments, which will not be repeated herein.

Figure 4:
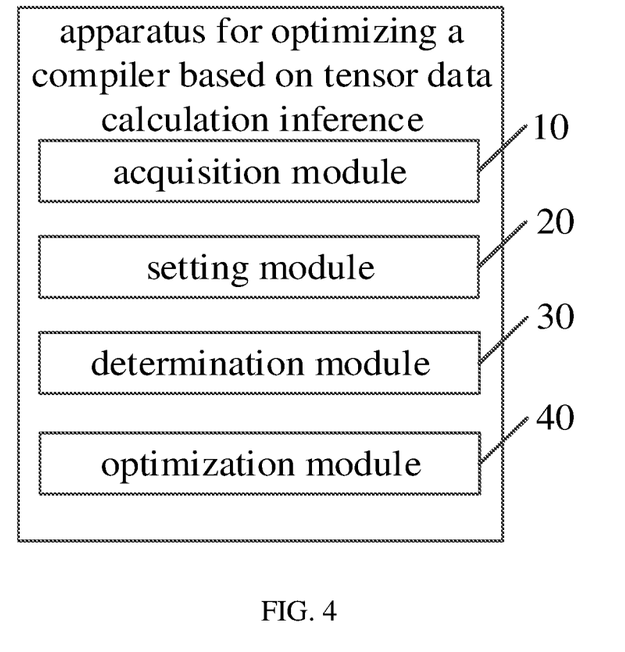
FIG. 4 is a schematic diagram of functional modules of an apparatus for optimizing a compiler based on tensor data calculation inference according to an embodiment of the present disclosure.

In addition, as shown in FIG. 4, the embodiments of the present disclosure further provide an apparatus for optimizing a compiler based on tensor data calculation inference, including:

an acquisition module 10 for obtaining design structure information of a compiler to be optimized, and obtaining a target intermediate conversion layer and an execution operation of the target intermediate conversion layer according to the design structure information; a setting module 20 for setting a target parameter tuning learning parameter according to the target intermediate conversion layer;

a determination module 30 for determining a compiler object to be optimized according to the execution operation of the target intermediate conversion layer; and an optimization module 40 for performing parameter tuning optimization on the compiler object to be optimized according to the target parameter tuning learning parameter through a target automatic parameter tuning strategy.

In this embodiment, obtaining design structure information of a compiler to be optimized, and obtaining a target intermediate conversion layer and an execution operation of the target intermediate conversion layer according to the design structure information; setting a target parameter tuning learning parameter according to the target intermediate conversion layer; determining a compiler object to be optimized according to the execution operation of the target intermediate conversion layer; and performing parameter tuning optimization on the compiler object to be optimized according to the target parameter tuning learning parameter through a target automatic parameter tuning strategy. Through the above means, the target parameter tuning learning parameter is set according to the target intermediate conversion layer of the compiler to be optimized, and the compiler object to be optimized is determined according to the execution operation of the target intermediate conversion layer. The parameter tuning optimization is performed on the compiler object to be optimized from the perspective of target parameter tuning learning parameter through the target automatic parameter tuning strategy, so that a compiler that fits the specified input model can be obtained, thereby effectively improving the efficiency of tensor data inference.

It should be noted that, the work flow described above is only illustrative, and does not limit the protection scope of the present disclosure. In practical applications, those skilled in the art can select some or all of them according to actual needs to achieve the purpose of the solution in this embodiment, which is not limited herein.

In addition, for technical details that are not described in detail in this embodiment, reference may be made to the method for optimizing the compiler based on tensor data calculation inference provided by any embodiment of the present disclosure, which will not be repeated herein.

In an embodiment, the acquisition module 10 is further for obtaining the design structure information of the compiler to be optimized, and obtaining a corresponding layered set according to the design structure information; selecting the target intermediate conversion layer in the layered set according to layered characteristics; obtaining a process of generating a target self-decoding by a target unified format intermediate representation element according to the target intermediate conversion layer; and obtaining the execution operation of the target intermediate conversion layer according to the process of generating the target self-decoding by the target unified format intermediate representation element.

In an embodiment, the target parameter tuning learning parameter includes at least one of a parameter tuning learning type, a target learning object and target parameter tuning times, and the setting module 20 is further for obtaining data exchange times and data decomposition performance of generating a target self-decoding; setting the parameter tuning learning type and the target learning object according to the data exchange times and the data decomposition performance; obtaining a target range of the parameter according to the intermediate conversion layer, and obtaining a parameter maximum value and a parameter minimum value according to the target range; and setting the target parameter tuning times according to the parameter maximum value and the parameter minimum value.

In an embodiment, the determination module 30 is further for obtaining an execution node of a target intermediate layer according to the execution operation of the intermediate conversion layer; obtaining a data optimization strategy of each layer set in the target intermediate layer; determining a target operation to be performed by each layer according to the execution node and the data optimization strategy of each layer; and obtaining the compiler object to be optimized according to the target operation to be performed by each layer.

In an embodiment, the determination module 30 is further for obtaining a calculation graph of a specified input model according to the target operation to be performed by each layer; obtaining memory loading data of each operation according to the calculation graph of the specified input model; obtaining multi-layer operation interaction data according to the memory loading data; and using a multi-layer operation of the multi-layer operation interaction data as the compiler object to be optimized.

In an embodiment, the determination module 30 is further for obtaining a unified format intermediate representation element to be processed according to the target operation to be performed by each layer; constructing a target feature matrix according to the unified format intermediate representation element to be processed; obtaining matrix calculation duration and matrix calculation occupied resources according to the target feature matrix; and in response that the matrix calculation duration is greater than a preset duration threshold and/or the matrix calculation occupied resources are greater than a preset storage resource threshold, using the matrix calculation duration and the matrix calculation occupied resources as the compiler object to be optimized.

In an embodiment, the optimization module 40 is further for setting a corresponding initial optimization strategy according to the compiler object to be optimized; adjusting the initial optimization strategy according to the target parameter tuning learning parameter; obtaining a parameter optimization range according to the adjusted initial optimization strategy; and performing the parameter tuning optimization on the compiler object to be optimized within the parameter optimization range through the target automatic parameter tuning strategy, to obtain a compiler conforming to a specified input model.

For other embodiments or implementation methods of the apparatus for optimizing the compiler based on tensor data calculation inference according to the present disclosure, reference may be made to the above method embodiments, and details are not repeated herein.

In addition, it should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as Read Only Memory (ROM)/Random Access Memory (RAM), magnetic disk, optical disk) as described above, including several instructions to cause a terminal device (which can be a mobile phone, a computer, an integrated platform workstation, or a network device, etc.) to execute the method described in each embodiment of the present disclosure.

The above are only some embodiments of the present disclosure, and do not limit the scope of the present disclosure thereto. Under the concept of the present disclosure, equivalent structural transformations made according to the description and drawings of the present disclosure, or direct/indirect application in other related technical fields are included in the scope of the present disclosure.

What is claimed is:

1. A method for optimizing a compiler based on tensor data calculation inference, comprising:
    obtaining design structure information of a compiler to be optimized, and obtaining a target intermediate conversion layer and an execution operation of the target intermediate conversion layer according to the design structure information;
    setting a target parameter tuning learning parameter according to the target intermediate conversion layer;
    determining a compiler object to be optimized according to the execution operation of the target intermediate conversion layer;
    performing parameter tuning optimization on the compiler object to be optimized according to the target parameter tuning learning parameter through a target automatic parameter tuning strategy; and
    based on the optimized compiler object, controlling the target intermediate conversion layer to generate a compilation output result that matches a specified input model, for deployment and execution in a target hardware environment,
    wherein the determining the compiler object to be optimized according to the execution operation of the target intermediate conversion layer comprises:
    obtaining an execution node of a target intermediate layer according to the execution operation of the intermediate conversion layer;
    obtaining a data optimization strategy of each layer set in the target intermediate layer;
    determining a target operation to be performed by each layer according to the execution node and the data optimization strategy of each layer; and
    obtaining the compiler object to be optimized according to the target operation to be performed by each layer, and
    wherein the obtaining the compiler object to be optimized according to the target operation to be performed by each layer comprises:
    obtaining a calculation graph of the specified input model according to the target operation to be performed by each layer;
    obtaining memory loading data of each operation according to the calculation graph of the specified input model;
    obtaining multi-layer operation interaction data according to the memory loading data; and
    using a multi-layer operation of the multi-layer operation interaction data as the compiler object to be optimized.

2. The method of claim 1, wherein the obtaining the design structure information of the compiler to be optimized, and obtaining the target intermediate conversion layer and the execution operation of the target intermediate conversion layer according to the design structure information comprises:
    obtaining the design structure information of the compiler to be optimized, and obtaining a corresponding layered set according to the design structure information;
    selecting the target intermediate conversion layer in the layered set according to layered characteristics;
    obtaining a process of generating a target self-decoding by a target unified format intermediate representation element according to the target intermediate conversion layer; and
    obtaining the execution operation of the target intermediate conversion layer according to the process of generating the target self-decoding by the target unified format intermediate representation element.

3. The method of claim 1, wherein the target parameter tuning learning parameter comprises at least one of a parameter tuning learning type, a target learning object and target parameter tuning times;
    the setting the target parameter tuning learning parameter according to the target intermediate conversion layer comprises:
    obtaining data exchange times and data decomposition performance of generating a target self-decoding;
    setting the parameter tuning learning type and the target learning object according to the data exchange times and the data decomposition performance;
    obtaining a target range of the parameter according to the intermediate conversion layer, and obtaining a parameter maximum value and a parameter minimum value according to the target range; and
    setting the target parameter tuning times according to the parameter maximum value and the parameter minimum value.

4. The method of claim 1, wherein after the performing the parameter tuning optimization on the compiler object to be optimized according to the target parameter tuning learning parameter through the target automatic parameter tuning strategy, the method further comprises:
    setting a corresponding initial optimization strategy according to the compiler object to be optimized;
    adjusting the initial optimization strategy according to the target parameter tuning learning parameter;
    obtaining a parameter optimization range according to the adjusted initial optimization strategy; and
    performing the parameter tuning optimization on the compiler object to be optimized within the parameter optimization range through the target automatic parameter tuning strategy, to obtain a compiler conforming to a specified input model.

5. A device for optimizing a compiler based on tensor data calculation inference, comprising a memory, a processor, and a program for optimizing the compiler based on tensor data calculation inference stored in the memory and executable on the processor, wherein the program for optimizing the compiler based on tensor data calculation inference is configured to implement the method for optimizing the compiler based on tensor data calculation inference of claim 1.

6. A non-transitory computer readable storage medium, wherein a program for optimizing a compiler based on tensor data calculation inference is stored in the non-transitory computer readable storage medium, and when the program for optimizing the compiler based on tensor data calculation inference is executed by a processor, the method for optimizing the compiler based on tensor data calculation inference of claim 1 is implemented.

\* \* \* \* \*